J. R. & H. S. Robinson,
Stop Cock.
No. 795.
Reissued Aug. 10, 1859.
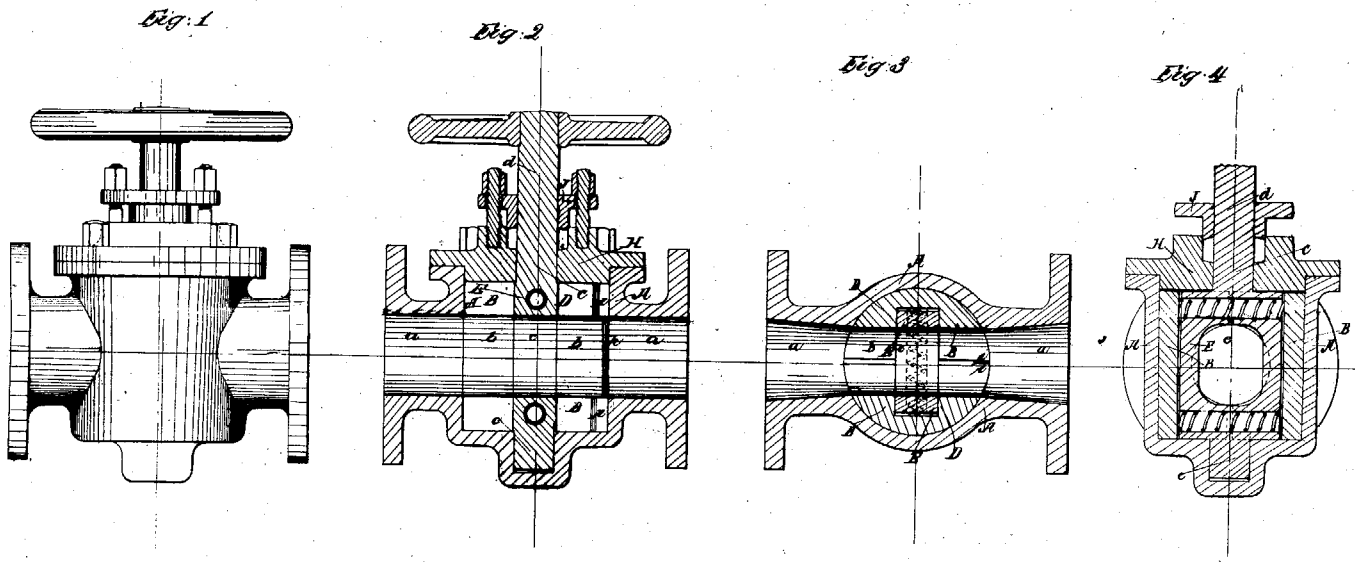
Inventors:
J. R. Robinson
H. S. Robinson

UNITED STATES PATENT OFFICE.

J. R. ROBINSON AND H. S. ROBINSON, OF CLINTON, MASSACHUSETTS.

IMPROVEMENT IN VALVE-COCKS.

Specification forming part of Letters Patent No. 21,366, dated August 31, 1858; Reissue No. 795, dated August 16, 1859.

*To all whom it may concern:*

Be it known that we, J. R. ROBINSON and H. S. ROBINSON, of Clinton, in the county of Worcester and State of Massachusetts, have invented new and useful improvements on that form of valves in which one port in a valve-chamber is covered and uncovered by a valve sliding in the arc of a circle, the said valve being made separate from its spindle, and being so fitted thereto that while the spindle forms the means by which the valve is turned, the valve itself is free to move to and from the axis of the spindle, of which the following is a specification.

The valve when so placed as to uncover its port leaves a passage for the fluid around the valve and the valve-spindle from the induction-port in the valve-chamber to the eduction-port in the same. When the valve is so placed as to cover its port in the valve-chamber, it will prevent the passage of a fluid from the chamber through the port that the valve covers, but will not prevent its passage back through the port into the valve-chamber, as a pressure against the face of the valve will "crowd" (push or force) it from its seat, so as to let the fluid pass around the valve into the valve-chamber and out through the other port.

The nature of the invention consists in so improving the construction of this valve that when it is in position to leave its ports uncovered there will be a passage or passages from the induction port or ports in the valve-chamber to the eduction port or ports in the same through the valve and the valve-spindle, thereby causing less friction to the steam, water, air, illuminating or other gas, or other elastic or non-elastic fluid passing through it, and thus obviating loss of pressure or head; and, moreover, in so constructing the valve that when it is in position to cover its ports it will prevent the flow of a fluid from the valve-chamber through either of the ports alternately, so long as the spindle remains unturned; and, also, in so constructing it that the springs which hold the separate parts of the valve against their seats shall not act on the spindle to force it from its center of motion.

To enable others skilled in the art to make and use our invention we will proceed to describe its construction and operation; and we do hereby declare that the following is a full and exact description thereof, reference being had to the accompanying drawings, and to the letters of reference marked thereon.

The accompanying drawings represent one of the forms in which the said invention may be carried into effect, Figure 1 being a side elevation of a valve-cock or gate constructed according thereto; Fig. 2, a longitudinal vertical section; Fig. 3, a longitudinal horizontal section, and Fig. 4 a vertical cross section.

The same letters of reference are made use of to indicate the same parts throughout.

*a a* represent the ports formed in or with the outer casing, A, of the valve, and communicate, as shown, with the cylindrical chamber formed in the casing. Into this chamber is accurately fitted the valve B, divided vertically into two separate and equal portions. The thoroughfare *b e* passes through the valve B, and also through the rectangular blade E, formed on the valve spindle C, which blade has its sides fitted loosely into vertical recesses or grooves D, formed in the respective halves of the valves, and constitutes the means whereby any circular movement given to the spindle is imparted to them. The part *d* of the valve-spindle C which is situated above the blade E passes through and is capable of turning freely in a stuffing-box or gland, J, formed in the cover H of the cylindrical valve-chamber, the lower portion, *c*, (beneath the blade,) being, like the upper portion, cylindrical in form, and working in a suitable recess or cavity formed in the bottom of the valve-chamber, as shown. The helical springs passing through holes in the blade of the spindle bear against and are compressed between the bottoms of the recesses or grooves D, formed in the separate halves of the valves, which (the halves) they hence tend to force asunder and keep in contact with the facing or interior surface of the chamber, thereby following up the wear of the valve and facing, and maintaining an accurate fit between them.

The valve, in the position represented in the drawings, is wide open, the thoroughfare *b e* coinciding with the ports *a a* and forming a straight passage through the valve and valve-spindle, from port to port, as before stated.

It will readily be seen that on turning the valve by means of its spindle into a position at right angles to the one represented, the ports *a a* will be covered, the valve being made sufficiently large in diameter, with relation to the size of the ports and thoroughfare, not only to allow cover for the ports, but also to allow a sufficient amount of lap beyond their edges to prevent leakage. The blade E of the spindle is made somewhat thicker than the diameter of the upper end of the spindle, or otherwise may have a small collar formed thereon, thereby constituting a shoulder which, without being intended to act as a perfect joint with the cover H, will serve to check a flow of fluid outward from the valve-chamber around the spindle whenever it may be necessary to renew the packing of the stuffing-box or gland J while the valve is under pressure.

It is also to be observed that the length of the valve B and blade E are made slightly less than that of the valve-chamber, in order that they may not become bound or fixed therein (by expansion) when their temperature exceeds that of the valve-casing. For the same reason the diameters of the cylindrical portions of the spindle C are made correspondingly less than those of the respective holes in the casing A and cover H in which they work.

It will be obvious, on inspection of the drawings, that the springs in the absence of pressure on the valves, will keep both halves thereof in contact with the interior facing of the valve-chamber, as also that by being passed through holes in the blade E, as described, all pressure or strain of the springs upon the journals of the spindle is avoided, which result may otherwise be arrived at by various mechanical contrivances or by introducing any equal springs of convenient form between the separate pieces of the valve and the valve-spindle. In valves made in separate parts with springs arranged substantially as described, the journals of the spindle, being entirely relieved from all side strain, will retain their perfect form much longer than where an unequal pressure is thrown on the spindle, as in the common round sliding valve.

It will now be seen that the form of valve constructed in separate pieces, similarly as described with reference to the accompanying drawings, embodies that feature of the invention which has reference to the prevention of the flow of a fluid from the valve-chamber through either of the ports alternately so long as the spindle remains unturned. For it is obvious that when the position of the spindle is such as to bring the faces of the valve so as to cover the ports *a a*, a pressure entering at either one or other of the ports will "crowd" or force that portion of the valve which covers the port in question backward from its seat, thereby allowing the fluid to pass into the chamber, where its pressure being upon the back of that part of the valve which covers the opposite port will press it to its seat and prevent the escape of the fluid from the chamber.

In order to prevent a vibration or chattering of the parts, which would otherwise be likely to occur at times when the valve was but little open, the induction end *h* of the thoroughfare *b* is made somewhat larger than the eduction end of the same, thereby causing the induction-port to be slightly open to the valve-chamber before the opposite or eduction-port has commenced opening for the egress of the fluid therefrom. To insure deriving the advantage of this arrangement in cases where the valve is to be moved by hand, a pointer or arrow is placed on the spindle, (or on the arm or wheel by which the spindle is to be turned,) pointing in the direction in which it is intended to have the fluid flow through the valve, which pointer, in connection with the words "open" and "shut," or other symbol, or otherwise with fixed stops placed upon the cap H or casing A, renders the working of the valve extremely simple.

To insure the free movement of the two parts of the valve upon the blade E of the spindle it is essential that the faces of those parts wear equally on both sides of a line drawn from the center of the spindle, parallel with the sides of the blade. It is hence necessary that they should have the same amount of bearing-surface on each side of the line named. To effect this as much bearing-surface is added at *i* as will compensate for that taken off at *h*.

If it is wished to have the valve open and close its ports with less movement of the spindle than that required in the construction shown in the before-mentioned figures—as, for example, when the valve is used as a steam or exhaust valve to a steam-engine—the size of the valve must be varied in proportion to the width of the ports, either by making the ports narrower and longer or by increasing the diameter of the valve while the ports remain unaltered. In this construction of the valve the passage through the spindle will not be at right angles to the sides of the blade, as in the drawings, but will vary more or less from that angle, according as the valve is proportioned to open its ports with a greater or less motion of the spindle.

When it is desirable to open the ports with still less motion of the spindle, two or more passages are formed through the valve connecting corresponding ports formed in the valve-chamber.

In all cases, whether having one or more passages through the valve and spindle, or through the valve alone, the passage or passages must be placed at such an angle with the sides of the blade of the spindle, as to insure free movement of the several parts of the valve thereon by having, as before explained, an equal amount of bearing-surface on either side of a line drawn from the axis of the spindle parallel to the sides of the blade, or, in other words, the valves are always to be so constructed that when the ports are covered and there is the same amount of lap at either side of each of them the position of the blade of the spindle shall be such that a line drawn from the center of the induction port or ports, or from the center of the eduction port or ports, to the center of the valve-spindle shall run parallel to the sides of the blade thereof.

In some cases it is required to have the valve so constructed that when closed it shall stop the flow of a fluid through it in one direction only—as for the purpose of relieving a steam-engine cylinder from water by the valve being forced from its seat and permitting the egress of the water, or for the purpose of an exhaust-valve to a non-condensing steam-engine, so that when the pressure in the cylinder runs below that in the exhaust-pipe the steam therein may force the valve from its seat and pass around it to the cylinder. In these and other similar instances the valve is either made in one piece and kept to its seat, in the absence of pressure by springs interposed between the valve and the spindle, in the usual manner, or, if in order to remove the pressure of the springs from the spindle, the valve be made in separate pieces, it is constructed so that the part which is presented to the induction port or ports in the valve-chamber when the valve is closed is formed with a face which does not cover the said port or ports, but has bearing-surfaces at or near the ends or extremities of the valve, outside the port, thus leaving a space for the passage of a fluid between itself and the valve-chamber, and causing the valve to allow the flow of a fluid in one direction, while stopping it in the other. When used as an exhaust valve to a steam-engine, and whether made in one or more pieces, it is constructed so as to have as little waste space as possible in the valve-chamber to be filled with steam at each stroke of the engine.

We are aware that round sliding valves have previously been made with a spindle separate from the valve, and fitting into it, so as to leave the valve free to move toward or from the axis of the spindle; but the passage for the fluid in such valves has not been straight through the valve and spindle, as in the improved form described, but has passed around them between the valve and the valve-chamber, (the chamber forming one side of the passage,) and has consequently been curved or crooked in form. Such valves have, moreover, been made in but one piece, thus covering one port only in the valve-chamber, and stopping the flow of a fluid in but one direction at a time. This form of construction also involves the objection that the thrust of the springs, already alluded to, is thrown upon the journals of the valve-spindle.

Although it is important sometimes to have the valve when closed stop a flow from one direction only, there are many cases in which, when the valve is used as a stop-valve, it should be able to prevent a flow through it in either direction so long as the spindle remains unturned; thus, for instance, when placed in a steam-pipe leading to a dye-tub, or to any vessel where a liquid is to be heated by forcing the steam directly into it, it is necessary not only to guard against the steam-pressure on one side of the valve, when closed, but, in case of a vacuum being formed in the steam-pipe, to guard against the atmospheric pressure on the other side, otherwise the liquid is liable to be forced past the valve into the steam-pipe.

It is, however, to be observed that we do not confine ourselves to valves made in separate pieces and that the improved valve made in one piece has the advantage over the common form of round sliding valves of giving a straight instead of a curved or crooked passage between the induction and eduction ports of the valve-chamber, or, when so required, of having two or more straight passages from separate induction-ports in the valve-chamber to separate eduction-ports in the same. When made in separate pieces, it has in addition to the straight passage the further advantage of withstanding a pressure from either direction alternately, so long as the spindle remains unturned, as also of entirely removing the pressure of the springs from the same. When made as described, for a steam-engine, it has the combined advantages of the straight passage and of removing the side strain of the springs from the spindle, while retaining the capability, when closed, of stopping a flow through it in one direction only.

We are aware that plug-cocks have straight passages through them when open, but many differences exist between plug-cocks and valves constructed according to the present invention. Some of these may be pointed out. Thus, plug-cocks, in order to be tight, must stop the flow of a fluid at the induction-port of the case, and the plug has to be drawn or pressed into the case with such force that it requires great power to move it, apart from that necessary to overcome the friction caused by the pressure of the fluid; and, further, as there is no provision for a greater ratio of expansion in the plug than in the case, the greater expansion of the plug (in cases when these cocks are used to stop the flow of hot fluids) often causes it to stick fast, and so great is the trouble arising from this cause that plug-cocks of large size are of very little value for stopping or regulating the flow of fluids at high or variable temperatures.

Now, it has been shown that the valve which forms the subject of this invention does not stop the flow of a fluid through it by sliding a face over the induction port or ports in the valve-chamber and holding it there, but effects the same by sliding a face over the eduction port or ports therein, and that it is so constructed as to provide for the greater expansion of the valve than of the case, in the line of the diameter, by leaving the valve free to move upon the spindle and by the yielding of the springs, and in the direction of its length by making the valve and blade of the spindle shorter than the valve-chamber.

It will also be apparent that the only resistance to the motion of the valve in opening or closing its ports, in addition to the slight friction caused by the packing in the gland and the friction of the springs, is that caused by the pressure of the fluid; and lastly, the wear of the valve-faces is automatically compensated for by the freedom of the separate parts to move upon the blade of the spindle.

In this specification the description has with some few exceptions been confined to the form of valve exhibited in the drawings. It is evident, however, that many changes may be made in the form and number of the parts which embody the invention herein described without in any way departing from its spirit.

What we claim as our invention, and wish to secure by Letters Patent, is—

1. The method of constructing valves, valve-cocks, and gates, substantially as specified, so that when the port or ports therein are uncovered there shall be a straight passage or passages from the induction port or ports in the valve-chamber to the eduction port or ports in the same, for the purposes described, whether the valves in such valves, valve-cocks, and gates are made in one or more than one piece.

2. Making the valves in valves, valve-cocks, and gates in separate or detached pieces, substantially as and for the purposes described.

J. R. ROBINSON.
H. S. ROBINSON.

Witnesses:
J. T. DAME,
EZRA SAWYER.